United States Patent [19]

Fries

[11] Patent Number: 5,237,228
[45] Date of Patent: Aug. 17, 1993

[54] SUBMERSIBLE MACHINE

[75] Inventor: Hjalmar Fries, Spanga, Sweden

[73] Assignee: ITT Flygt AB, Solna, Sweden

[21] Appl. No.: 791,820

[22] Filed: Nov. 13, 1991

[30] Foreign Application Priority Data

Dec. 13, 1990 [SE] Sweden .................................. 9003982

[51] Int. Cl.⁵ .......................... H02K 5/10; F16C 27/08
[52] U.S. Cl. ......................................... 310/87; 310/90;
384/223; 366/342
[58] Field of Search ........................ 310/87, 85, 89, 90;
366/342, 343; 384/215, 218, 223

[56] References Cited

U.S. PATENT DOCUMENTS

| | | | |
|---|---|---|---|
| 3,688,140 | 8/1972 | Schaefer | 310/89 |
| 4,810,918 | 3/1989 | Kachuk | 310/90 |
| 4,963,777 | 10/1990 | Blum | 310/87 |
| 5,015,159 | 5/1991 | Mine et al. | 310/87 |

Primary Examiner—Steven L. Stephan
Assistant Examiner—Matthew Nguyen
Attorney, Agent, or Firm—Menotti J. Lombardi

[57] ABSTRACT

A submersible machine has an electrically driven rotating mixer. The electric motor and hydraulic part are connected by a rotary shaft. The shaft end opposite from the hydraulic part is resiliently supported in a stator casing which surrounds the motor.

3 Claims, 1 Drawing Sheet

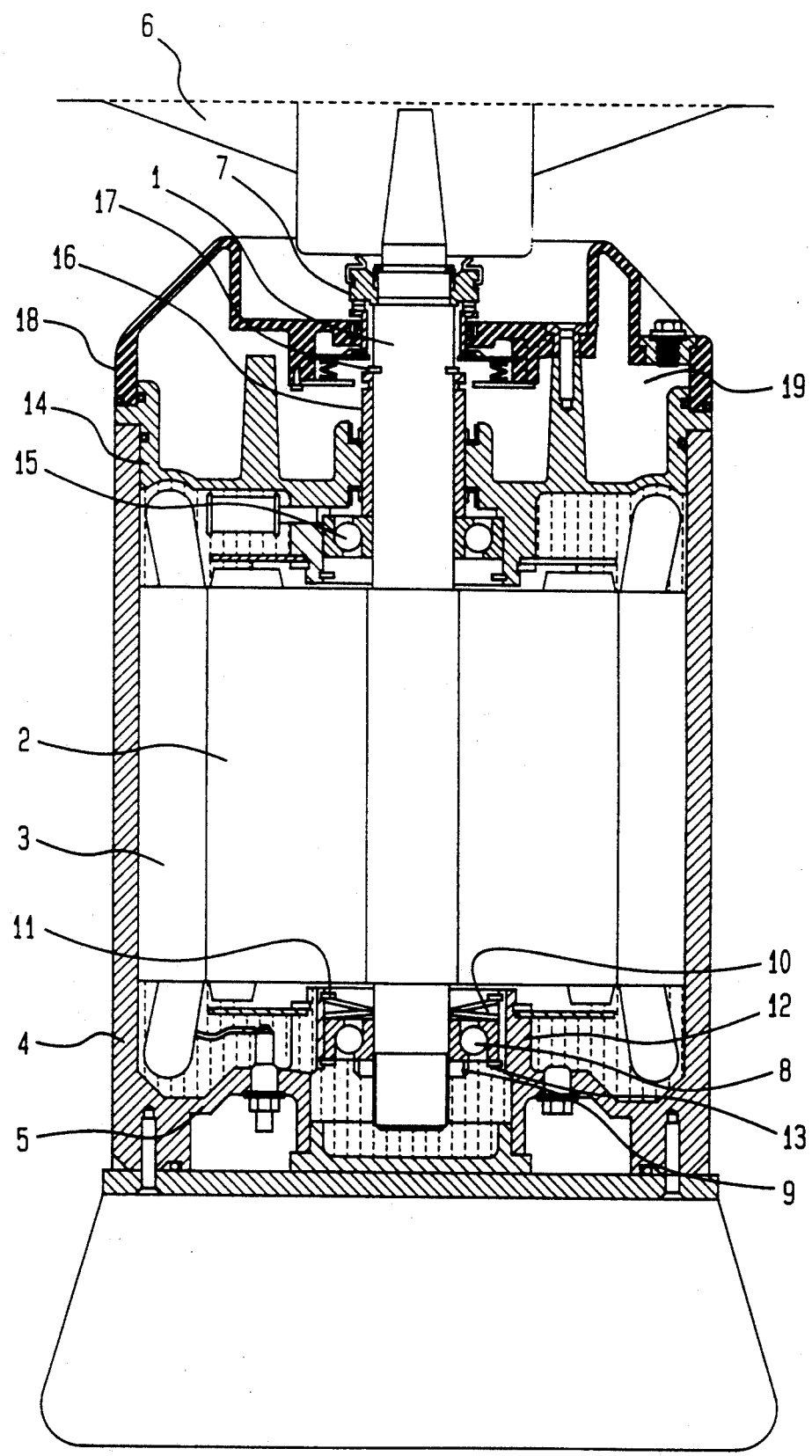

SUBMERSIBLE MACHINE

BACKGROUND OF THE INVENTION

The invention concerns a submersible machine such as an electrically driven submersible mixer.

A machine of this type comprises an enclosed electric motor which via a rotary shaft and possibly a gear box drives a propeller which obtains mixing of the surrounding medium. The shaft is normally supported by two ball bearings one on each side of the rotor and is sealed on its way towards the propeller by help of one or several seals which prevent the surrounding medium from entering the motor along the shaft. A mixer of this type is shown in the Swedish Design Registration 33 623.

The enclosure of the motor is normally designed with a gable and a cylinder formed in one piece, while the gable heading the propeller is attached to the cylinder formed part by screws. The enclosure must of course be so rigid that it is able to absorb strong torque and axial forces caused by the rotation of the propeller and its thrust. This means that the bolted joint becomes relatively expensive and in addition takes a lot of axial space.

According to the invention a solution has been obtained which solves the design problem mentioned, provides considerable cost savings, and obtains a reduction of the diameter of the enclosure.

SUMMARY OF THE INVENTION

The objects and advantages of the invention will become apparent by the present invention in which a submersible machine has an electric motor and a hydraulic part connected by a rotary shaft, and in which the shaft has its end turned away from the hydraulic part resiliently supported in a stator casing surrounding the motor.

BRIEF DESCRIPTION OF THE DRAWINGS

The features and objects of this invention will become more apparent by reference to the following description taken in conjunction with the sole drawing which shows a partial cross-sectional view of the machine according to the invention.

DETAILED DESCRIPTION OF THE PREFERRED EMBODIMENT

In the drawing a rotary shaft 1 is connected to the rotor 2 of an electric motor. The stator 3 is surrounded by a stator housing formed by a cylindric part 4 and a gable 5. A propeller 6 is mounted on the shaft 1, and an intermediate seal device is mounted on the shaft behind the propeller. The machine includes bearing 8, a locking nut 9, spring means 10, a lock ring 11, and a cup portion 12 is formed as part of the gable 5. A lock ring 13, a socket 16, another lock ring 17, a cap 18, and a seal room 19 are shown.

The mixing device according to the invention is thus meant to operate entirely submersed in the medium to be mixed. Sometimes the mixer must operate at very deep levels in a liquid which means that the mixer enclosure must withstand very strong static pressures. The enclosure must thus be absolutely seal proof.

In order to provide a design which will not deform, the stator housing, which forms the enclosure for the main part of the driving unit, is designed as a rigid construction preferably made of cast iron. The cylindric part 4 and the gable 5 are manufactured as one piece, and the gable 5 supports the bearing 8.

The bearing 8 which is of a type that supports axial forces in one direction, is mounted on shaft 1 and in the central part of the gable 5. The central part is designed like a cup 12. The bearing is positioned so that its outer ring is moved behind a lock ring 13 in the cup portion 12, thus causing the cup portion to surround the outer ring with some play. Springs, such as one or several cup springs 10, are mounted in the cylindric part of the cup 12. The springs 10 are supported by a lock ring 11 in the cup on the side of the bearing 8 that is further from the end of the shaft.

A nut 9 is screwed into the end of the shaft into contact with the inner ring of the bearing 8. As the nut 9 is screwed further inwards, the bearing will be moved against the force of the springs 10. This movement continues until the contact between the outer ring of the bearing and the lock ring is somewhat relieved. In this position the bearing 8 and the shaft 1 are floatingly supported in the stator housing 4, 5 and prestressed by a dominating axial force.

The spring arrangement may alternatively be arranged on the shaft between the unit and the bearing, the shaft then being allowed to slide axially in the inner ring of the bearing. According to a special arrangement, the construction is given such resilience that the demand for springs is eliminated.

The attachment of the bearing support 14 for the other bearing 15 may then be very simple as it only supports axial forces from the propeller and the prestressed spring 10. These forces act in the same direction. Thus the bearing is attached at a shoulder on the shaft 1 by help of a socket 16, which in its turn is locked on the shaft by a lock ring 17. The circumference of the bearing support 14 is sealed against the cylindric part 4 by O-rings with no need for screws or the like.

The mechanical seal 7 is connected to an area 19 adjacent the bearing support 14 which preferably contains oil for lubricating and cooling of the seal surfaces. The area 19 is limited by a gable cap 18 connected to the circumference of the support 14.

By help of the invention is obtained a non-expensive and simple design which simultaneously offers a rigid attachment of the machine parts into the enclosure. Further advantages are the lack of the conventional gable heading the propeller which means a more slim design. In addition the resilient attachment of the bearing 8 in the stator housing means that the bearing are pressed away from the propeller in their initial positions already. This means that there is no play which may cause leakage when the machine starts and stops.

While I have described the principles of my invention in connection with specific apparatus, it is to be clearly understood that this description is made only by way of example and not as a limitation to the scope of the invention as set forth in the accompanying claims.

What is claimed is:

1. In a submersible machine comprising an enclosed electric motor have a stator (3), rotor (2) and shaft (1), and a propeller (6) being mounted on one end of said shaft, the improvement comprising:
    a one piece stator housing having a cylindrical part (4) and a gable portion (5);
    said gable portion (5) in its central part being formed as a cup (12) with an opening therethrough;

another end of said shaft (1) opposite said one end of said shaft extending through said cup (12) opening and being mounted therein by a bearing having an outer ring and an inner ring (8);

spring means (10) being arranged between said bearing (8) and a lock ring (11) which is positioned within said cup, whereby said spring means (10) presses one side of the outer ring of said bearing (8) to move said bearing (8) and said shaft (1) toward said gable (5); and a nut (9) being screwed onto said other end of said shaft (1) and into contact with the inner ring of said bearing (8) to move said bearing (8) against the force of said spring means (10) a predetermined amount, such that said bearing (8) and said shaft (1) are prestressed by a dominating axial force.

2. The improvement according to claim 1 wherein said spring means are one or more cup springs.

3. The improvement according to claim 2 including another locking ring (13) positioned within said cup adjacent the other side of the outer ring of said bearing (8).